United States Patent
Naidu et al.

(10) Patent No.: US 10,480,380 B2
(45) Date of Patent: Nov. 19, 2019

(54) REDUCING HEATING OF A PARTICULATE FILTER DURING A REGENERATION EVENT

(71) Applicant: FORD GLOBAL TECHNOLOGIES, LLC, Dearborn, MI (US)

(72) Inventors: Ashish Kumar Naidu, Basildon (GB); Peter George Brittle, Romford (GB)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 53 days.

(21) Appl. No.: 15/499,991

(22) Filed: Apr. 28, 2017

(65) Prior Publication Data

US 2017/0314446 A1 Nov. 2, 2017

(30) Foreign Application Priority Data

Apr. 29, 2016 (GB) .................................. 1607501.2

(51) Int. Cl.
*F01N 9/00* (2006.01)
*F01N 3/023* (2006.01)

(52) U.S. Cl.
CPC .............. *F01N 9/002* (2013.01); *F01N 3/023* (2013.01); *F01N 2240/04* (2013.01);
(Continued)

(58) Field of Classification Search
CPC ............ F01N 2240/04; F01N 2260/04; F01N 2430/00; F01N 2900/104; F01N 3/023; F01N 9/002
See application file for complete search history.

(56) References Cited

U.S. PATENT DOCUMENTS

2009/0182479 A1* 7/2009 Daneau ................. F02D 41/029
                                                                    701/102
2010/0205942 A1  8/2010 Fujiwara et al.
(Continued)

FOREIGN PATENT DOCUMENTS

CN  104454085 A  3/2015
CN  104806365 A  7/2015
(Continued)

OTHER PUBLICATIONS

JP-2007237794-A English Translation (Year: 2007).*
Great Britain Search and Examination Report for Great Britain Application No. GB1607501.2 dated Oct. 18, 2016.

*Primary Examiner* — Audrey K Bradley
*Assistant Examiner* — Anthony Ayala Delgado
(74) *Attorney, Agent, or Firm* — Brooks Kushman PC; David Kelley

(57) ABSTRACT

A vehicle and method reduce heating of a particulate filter during a regeneration event in response to an accelerator pedal tip-out and particulate filter temperature exceeding or anticipated to exceed a threshold by fueling the engine to reduce oxygen in the exhaust flowing to the particulate filter. An electric machine may be operated as a generator charging a battery to compensate or offset torque produced by the fueling of the engine. The current or anticipated particulate filter temperature may be estimated by a soot combustion model for a current regeneration event and/or a future regeneration event based on soot loading of the particulate filter.

13 Claims, 5 Drawing Sheets

(52) U.S. Cl.
CPC ...... *F01N 2260/04* (2013.01); *F01N 2430/00* (2013.01); *F01N 2430/06* (2013.01); *F01N 2900/08* (2013.01); *F01N 2900/104* (2013.01)

(56) References Cited

U.S. PATENT DOCUMENTS

| | | |
|---|---|---|
| 2013/0174536 A1 | 7/2013 | Yacoub |
| 2014/0366722 A1 | 12/2014 | Brown |
| 2015/0033716 A1 | 2/2015 | Matsuo et al. |

FOREIGN PATENT DOCUMENTS

| | | | |
|---|---|---|---|
| FR | 2928967 A1 | | 9/2009 |
| JP | 2007237794 A | * | 9/2007 |
| JP | 2007237794 A | | 9/2007 |
| KR | 20070109490 A | | 11/2007 |

* cited by examiner

REDUCING HEATING OF A PARTICULATE FILTER DURING A REGENERATION EVENT

CROSS-REFERENCE TO RELATED APPLICATIONS

This application claims foreign priority benefits under 35 U.S.C. § 119(a)-(d) to GB Application 1607501.2 filed Apr. 29, 2016, which is hereby incorporated by reference in its entirety.

TECHNICAL FIELD

This disclosure relates to a vehicle having a particulate filter arranged to receive exhaust gas from an engine and a method of protecting a particulate filter from overheating during a regeneration event when the engine is decelerating due to an accelerator pedal tip-out.

BACKGROUND

It is well known to provide a particulate filter (PF) in the exhaust system of an engine to filter out soot from the exhaust gas flowing from the engine to atmosphere. When the engine is a diesel engine, such a particulate filter is normally referred to as a diesel particulate filter or "DPF".

A particulate filter (PF) can be damaged during what is known as a "deceleration fuel cut-off" scenario in which during an accelerator pedal tip-out event the fuel is cut-off to the engine of a vehicle to save fuel during deceleration of the vehicle. If the fuel supply to the engine is cut-off when a soot combustion process referred to as a "regeneration event" is active, the percentage of Oxygen in the exhaust gas flowing to the particulate filter will be greatly increased. This increase in Oxygen concentration will often cause runaway combustion to occur in the particulate filter if a large quantity of soot remains in the particulate filter to be combusted during the regeneration process.

When runaway combustion occurs, the temperature within the particulate filter can rise to more than 1000° C. and it is possible to crack the particulate filter, melt the particulate filter substrate or degrade the catalyst washcoat which is present to aid the removal of other regulated emissions (HC, CO or NOx). In an extreme case this overheating condition can result in the particulate filter material combusting which can lead to thermal damage of surrounding components.

A temperature that is likely to result in damage to the particulate filer is an unacceptably high temperature and the particulate filter can be considered to be overheating when subject to such a temperature.

SUMMARY

A system and method of reducing heating of a particulate filter connected to receive exhaust gas from an engine of a motor vehicle during a regeneration event when an accelerator pedal tip-out is active include checking whether a regeneration event is taking place and whether an accelerator pedal tip-out event is present and, if a regeneration event is taking place and an accelerator pedal tip-out event are both present, using active temperature control to control the temperature within the particulate filter during the regeneration event by operating an electric machine drivingly connected to the engine in a generator mode to charge a battery of the motor vehicle and by supplying fuel to the engine to generate torque to compensate for the additional load applied to the engine by the electric machine, the fuel supplied to the engine acting to reduce the Oxygen concentration of the exhaust gas flow to the particulate filter.

Supplying fuel to the engine to generate torque may comprise increasing the amount of fuel supplied to the engine from zero to a desired amount required to produce the compensating torque.

The engine may be a direct injection diesel engine and the particulate filter may be a diesel particulate filter.

The system and method may further only use active temperature control when regeneration of the particulate filter is occurring if one of a sensed exhaust gas temperature at an outlet from the particulate filter and a sensed particulate filter temperature exceeds a corresponding threshold indicating that the temperature of the particulate trap is unacceptably high.

The method may further comprise using a model to predict the temperature of the particulate filter during the next regeneration event and using active temperature control when the next regeneration event occurs if the prediction of particulate filter temperature from the model indicates that the temperature of the particulate trap during the regeneration event is predicted to be unacceptably high.

The prediction of particulate filter temperature during the next regeneration event may be provided by a soot combustion model.

The temperature may be unacceptably high if it is above a predefined temperature limit.

The system and method may further comprise actively reducing the state of charge of the battery prior to a regeneration event if the state of charge of the battery is above a predefined level and an estimate of the current soot loading of the particulate filter indicates that regeneration of the particulate filter will be required in the near future.

Regeneration of the particulate filter may be required in the near future if the estimate of the current soot loading of the particulate filter is above a first soot loading limit.

The estimate of the current soot loading of the particulate filter may be based upon one of a model of soot production since the last regeneration event and a measurement of pressure drop across the particulate filter.

The electric machine may be an integrated starter generator.

In one or more embodiments according to the disclosure there is provided a motor vehicle having a combustion engine, a battery, an electric machine drivingly connected to the engine, an electrical energy storage device connected to the electric machine, a particulate filter arranged to receive exhaust gas from the engine and an electronic controller arranged to control the engine and the electric machine, the electronic controller being arranged to check whether a regeneration event is taking place and whether an accelerator pedal tip-out event is present and, if a regeneration event is taking place and an accelerator pedal tip-out event are both present, the electronic controller is arranged to use active temperature control to control the temperature within the particulate filter during the regeneration event by operating the electric machine drivingly connected to the engine in a generator mode to charge the battery of the motor vehicle and by supplying fuel to the engine to generate torque to compensate for the additional load applied to the engine by the electric machine, the increase in fuel supplied to the engine acting to reduce the Oxygen concentration of the exhaust gas flow to the particulate filter.

Supplying fuel to the engine to generate torque may comprise increasing the amount of fuel supplied to the engine from zero to a desired amount required to produce the compensating torque.

The engine may be a direct injection diesel engine and the particulate filter may be a diesel particulate filter.

The electronic controller may be arranged to only use active temperature control when regeneration of the particulate filter is occurring if one of a sensed exhaust gas temperature from a temperature sensor located at an outlet from the particulate filter and a sensed particulate filter temperature from a temperature sensor located within the particulate filter indicates that the temperature of the particulate trap is unacceptably high.

The electronic controller may include a model to predict the temperature of the particulate filter during the next regeneration event and the electronic controller may be arranged to use active temperature control when the next regeneration event occurs if the prediction of particulate filter temperature from the model indicates that the temperature of the particulate trap during the regeneration event is expected to be unacceptably high.

The model may be a soot combustion model that is used to provide a prediction of temperature in the particulate filter during the next regeneration event.

The temperature of the particulate filter may be unacceptably high if it is above a predefined temperature limit.

The electronic controller may be further arranged to actively reduce the state of charge of the battery prior to a regeneration event if the state of charge of the battery is above a predefined level and an estimate of the current soot loading of the particulate filter indicates that regeneration of the particulate filter will be required in the near future.

Regeneration of the particulate filter may be required in the near future if the estimate of the current soot loading of the particulate filter is above a first soot loading limit.

The estimate of the current soot loading of the particulate filter may be based upon one of a model of soot production since the last regeneration event stored in the electronic controller and a measurement of pressure drop across the particulate filter.

The pressure drop may be based upon outputs supplied to the electronic controller from a pressure sensor located upstream of the particulate filter and a pressure sensor located downstream of the particulate filter.

The electric machine may be an integrated starter generator.

The vehicle may be a mild hybrid vehicle.

The representative embodiments will now be described by way of example with reference to the accompanying drawings.

DETAILED DESCRIPTION

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the teachings of the disclosure.

Figure 1:
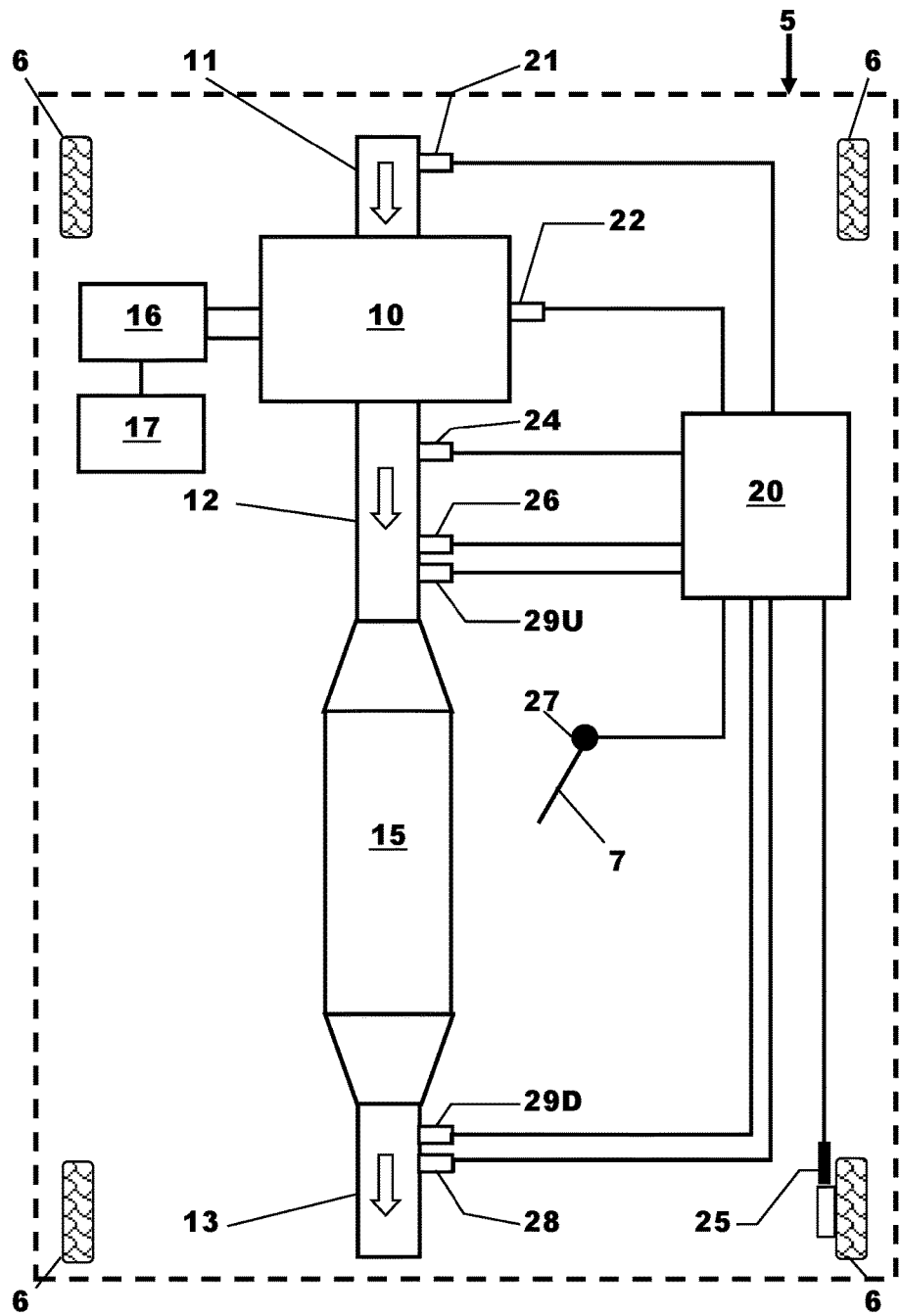
FIG. 1 is a schematic diagram of a motor vehicle constructed in accordance with a second aspect of the invention.

With reference to FIG. 1 there is shown a mild hybrid motor vehicle 5 having four road wheels 6, a direct injection diesel engine 10 and an electronic controller 20. The engine 10 is arranged to receive air through an inlet 11 and, although not shown, in most cases the flow of air to the engine 10 will be compressed by a supercharger or a turbocharger before it flows into the engine 10 in order to improve the efficiency of the engine 10.

Exhaust gas from the engine 10 flows through a first or upstream portion 12 of an exhaust system to a particulate filter in the form of a diesel particulate filter (DPF) 15 in this embodiment, and after passing through the DPF 15, the exhaust gas flows out to atmosphere via a second or downstream portion 13 of the exhaust system.

It will be appreciated that other emission control devices or noise suppression device may be present in the gas flow path from the engine 10 to the position where it exits to atmosphere.

An electric machine is drivingly connected to the engine 10. In the case of this example the electric machine is an integrated starter-generator (ISG) 16 that can be used to generate electricity or generate torque depending upon the mode in which it is operating. A battery 17 is connected to the ISG 16 along with associated control electronics (not shown). When the ISG 16 is operating as a generator it charges the battery 17 and, when the ISG 16 is operating as a motor, the battery 17 is arranged to supply electrical energy to the ISG 16. The ISG 16 is used to start the engine 10 and also, in the case of this example, is able to provide a limited torque boost to the engine 10 during acceleration or cruising of the vehicle 5.

The electronic controller 20 in the case of this example is arranged to receive inputs from a number of sensors such as, but not limited to, a mass airflow sensor 21 used to measure the mass of air flowing into the engine 10; an engine speed sensor 22; a Lambda/Oxygen ($\lambda/O_2$) sensor 24 to measure the air-fuel ratio/Oxygen content of the exhaust gas exiting the engine 10; a vehicle speed sensor 25 to measure the speed of the vehicle 5; a NOx sensor 26 to measure the level of NOx in the exhaust gas from the engine 10; an accelerator pedal position sensor 27 arranged to sense the position of an accelerator pedal 7; a temperature sensor 28 to measure the temperature of the exhaust gas exiting the DPF 15; an upstream exhaust gas pressure sensor 29U to sense the pressure of the exhaust gas upstream from the DPF 15; and a downstream exhaust gas pressure sensor 29D to sense the pressure of the exhaust gas downstream from the DPF 15.

It will be appreciated that in some cases a single differential pressure sensor connected to two pipes may be used in place of upstream and downstream sensors 29U and 29D. One of the pipes is connected near an inlet to the DPF 15 and the other of the pipes is connected near an outlet from the DPF 15.

The electronic controller 20 is operable to control the operation of the engine 10 and the operating state of the integrated starter-generator 16. It will be appreciated that the electronic controller 20 could be formed of several separate electronic units electrically connected together and need not be in the form of a single unit as shown in FIG. 1.

The electronic controller 20 is programmed, configured, or arranged to prevent overheating of the DPF 15 during a regeneration event when an "accelerator pedal tip-out event" is occurring by using active temperature control.

An "accelerator pedal tip-out event" is an event in which a driver of the vehicle 5 has removed their foot from the accelerator pedal 7 or the accelerator pedal 7 is being depressed by the driver such a small amount that it represents a zero torque demand situation. Normally, when such an accelerator pedal tip-out event occurs, the fuel supply to the engine 10 is cut-off so that no fuel is supplied to the engine 10 thereby increasing the fuel economy of the motor vehicle 5. Such an event is therefore often referred to as a Deceleration Fuel Cut-off event or DFCO. During a DFCO no torque is being generated by the engine which is rotated by the inertia of the motor vehicle transmitted via the driveline from the driven road wheels which are rotating because the motor vehicle is moving. The engine is therefore acting as a pump that pumps air through the attached exhaust system and hence through the DPF. The engine is in such a situation applying a braking force due to the torque required to rotate as a pump and the closed driveline between the engine and the driven road wheels An accelerator pedal tip-out event is in the case of this example sensed by the electronic controller 20 to be present using the input it receives from the accelerator pedal sensor 27 associated with the accelerator pedal 7.

The electronic controller 20 is arranged to operate the engine 10 to carry out a regeneration of the DPF 15 when it is determined that regeneration of the DPF 15 is required.

The requirement to regenerate the DPF 15 can be ascertained in a number of ways but generally is based upon whether a current soot loading is estimated to be above a predefined limit.

A soot model can be used to estimate a soot loading of the DPF 15 based upon an estimate of the soot produced by the engine 10 since the last regeneration event took place taking into account vehicle usage. The estimate of soot loading can then be compared to a soot loading limit and, if the estimated soot loading is above the soot loading limit, regeneration of the DPF 15 is initiated.

Alternatively, the soot loading can be estimated by sensing the pressure upstream and downstream of the DPF 15 using the two pressure sensors 29U, 29D to provide a value for the pressure drop across the DPF 15 which is indicative of DPF soot loading. The pressure drop can then be compared to a pressure drop limit indicative of a level of soot loading where regeneration is required and, if the measured pressure drop is above the pressure drop limit, regeneration of the DPF 15 is initiated.

It will be appreciated that the invention is not limited to any particular method for ascertaining when regeneration of the DPF 15 is required and any suitable method could be used.

Irrespective of the method used, when it is determined that regeneration of the DPF 15 is required, the electronic controller 20 can either act immediately to control the temperature within the DPF 15 using active temperature control or can delay the initiation of active temperature control until the temperature of the DPF 15 exceeds a predefined level.

For example, if the signal received by the electronic controller 20 from the exhaust gas temperature sensor 28 located downstream from the DPF 15 indicates that the temperature of the exhaust gas exiting the DPF 15 is excessive. That is to say, if the temperature of the exhaust gas measured by the temperature sensor 28 exceeds a predefined temperature limit ($T_{Lim}$), the electronic controller 20 will acts to actively control the temperature within the DPF 15 but if the temperature of the exhaust gas exiting the DPF 15 is below this predefined temperature limit ($T_{Lim}$) it takes no action but instead allows the regeneration of the DPF 15 to continue without intervention. In such a case the predefined temperature limit $T_{Lim}$ is set to a temperature above which damage is likely to occur such as, for example and without limitation, circa 850° C. It will be appreciated that the temperature sensed by the downstream temperature sensor 28 is not a measurement of the actual temperature within the DPF 15 but that the temperature within the DPF 15 can be inferred from this temperature measurement. The temperature within the DPF 15 is likely to be higher than this measured or modelled temperature.

It will be appreciated that instead of the downstream temperature sensor 28 a temperature sensor able to measure the temperature within the DPF 15 could be used and, in such a case, the predefined temperature limit could be set higher than 850° C. such as, for example, 950° C.

It will also be appreciated that instead of measuring the temperature of the DPF 15 or the exhaust gas flow through the DPF 15 during a regeneration event a soot combustion model could be used to predict whether overheating of the DPF 15 is likely to occur and, if it is likely to occur, the electronic controller 20 can act as soon as regeneration commences to prevent overheating of the DPF 15 during the regeneration event when an accelerator pedal tip-out event is also present.

Assuming that the determination of the electronic controller 20 is that the temperature within the DPF 15 is excessive or is likely to be excessive, that is to say, overheating of the DPF 15 is likely, the electronic controller 20 is arranged to use active temperature control to prevent overheating of the DPF 15 during regeneration.

Active temperature control comprises using the integrated starter-generator 16 to apply a load to the engine 10 by operating the integrated starter generator 16 as a generator to charge the battery 17 and compensating for the increased loading by increasing the torque output from the engine 10 by increasing the fuel supplied to the engine 10. It will be appreciated that prior to initiation of active temperature control the engine will be producing no torque if it is in a DFCO state and so the request for torque from the engine 10 will start combustion by providing fuel to the engine 10.

It will be appreciated that the additional load applied by the integrated starter generator 16 to the engine 10 during an accelerator pedal tip-out event would normally cause the engine 10 to decelerate faster than it would otherwise. However, one of the advantages of the invention is that the torque applied by the integrated starter generator 16 to the engine 10 is matched by an increase in torque output from the engine 10 so that the rate of deceleration of the engine 10 during an accelerator pedal tip-out event is substantially the same irrespective of whether the integrated starter generator 16 is being used to control overheating of the DPF 15 or not. The driver of the vehicle 5 is therefore unaware that measures are being taken to control overheating of the DPF 15 during a regeneration event and the deceleration of the vehicle 5 will be as expected by the driver.

The effect of requesting an increase in torque from the engine 10 during the accelerator pedal tip-out event is that additional fuel has to be supplied to the engine 10 to produce the extra torque. As before, prior to the initiation of active temperature control, if DFCO is present then no fuel will be being supplied to the engine 10 and so no torque will be being produced by the engine 10. The increase in fuel supplied to the engine 10 from zero has the effect of reducing the air/fuel ratio of the exhaust gas flow to the DPF 15 from substantially 100% air thereby reducing the Oxygen concentration of the exhaust gas flow to the DPF 15. It will be appreciated that the composition of air includes approximately 21% Oxygen.

The increased torque output from the engine 10 is in this case provided by increasing an engine torque set point within the electronic controller 20 which will result in the engine running thereby requiring a supply of fuel to be supplied and the quantity of Oxygen flowing to the DPF 15 will be reduced. The reduction in Oxygen in the exhaust gas entering the DPF 15 will slow the rate of soot combustion within the DPF 15 and so the temperature of the DPF 15 will be reduced.

The electronic controller 20 is arranged such that the torque output from the engine 10 is increased to match the load applied by the integrated starter-generator 16, that is to say, the torque increase demanded by the electronic controller 20 from the engine 10 is substantially equal to the torque applied by the integrated starter-generator to the engine 10.

In the case of one example, the concentration of Oxygen in the exhaust gas flow to the DPF 15 was reduced from 21% in a case where a conventional fuel cut-off was used during an accelerator pedal tip-out event to 5% Oxygen concentration when the integrated starter generator 16 was used to load the engine 10 and fuel was supplied to the engine 10 counteract the load applied by the integrated starter generator 16.

It will be appreciated that the use of the battery 17 as a load for the integrated starter-generator 16 rather than any other type of electrical load has the advantage that the energy stored in the battery 17 during use of the integrated starter-generator 16 for the purpose of active temperature control can be recycled back to the vehicle 5 from the battery 17 at a later time.

To provide sufficient charge capacity or 'headroom' to accommodate the electrical charge produced by the integrated starter generator 16 while it is being used to load the engine 10, the electronic controller 20 is advantageously further operable to take action to reduce the state of charge (SOC) of the battery 17 known as "active SOC reduction" prior to regeneration of the DPF 15 if the SOC is above a predefined SOC limit.

The SOC of the battery 17 can be actively reduced by: A) using the integrated starter generator 16 as a motor more frequently to provide a torque boost to the engine 10 thereby increasing the torque output of the engine 10 during an acceleration event; or B) using the integrated starter generator 16 as a motor to allow the torque output of the engine 10 to be reduced during vehicle cruising thereby reducing the fuel consumption of the engine 10; or C) inhibiting charging of the battery 17 so as to cause the battery 17 to be discharged over time until the SOC of the battery 17 falls below the predefined SOC limit.

To prevent the battery 17 being discharged when no regeneration event is imminent, the electronic controller 20 is operable to monitor the soot loading of the DPF 15 and only permit active discharging or active SOC reduction of the battery 17 when the level of soot in the DPF 15 is approaching a level where regeneration will be required. That is to say, the electronic controller 20 is operable to permit active SOC reduction of the battery 17 only when a first predefined soot loading limit is exceeded.

The first predefined soot loading limit is slightly lower than a second higher soot loading limit used as a trigger for regeneration.

Therefore, in summary, when an accelerator pedal tip-out event occurs during a DPF regeneration event, overheating of the DPF is prevented or reduced using active temperature control in which a load is applied to the engine by the electric machine and the applied load is counteracted by increasing the torque output from the engine requiring additional fuel to be supplied to the engine.

Figure 2A:
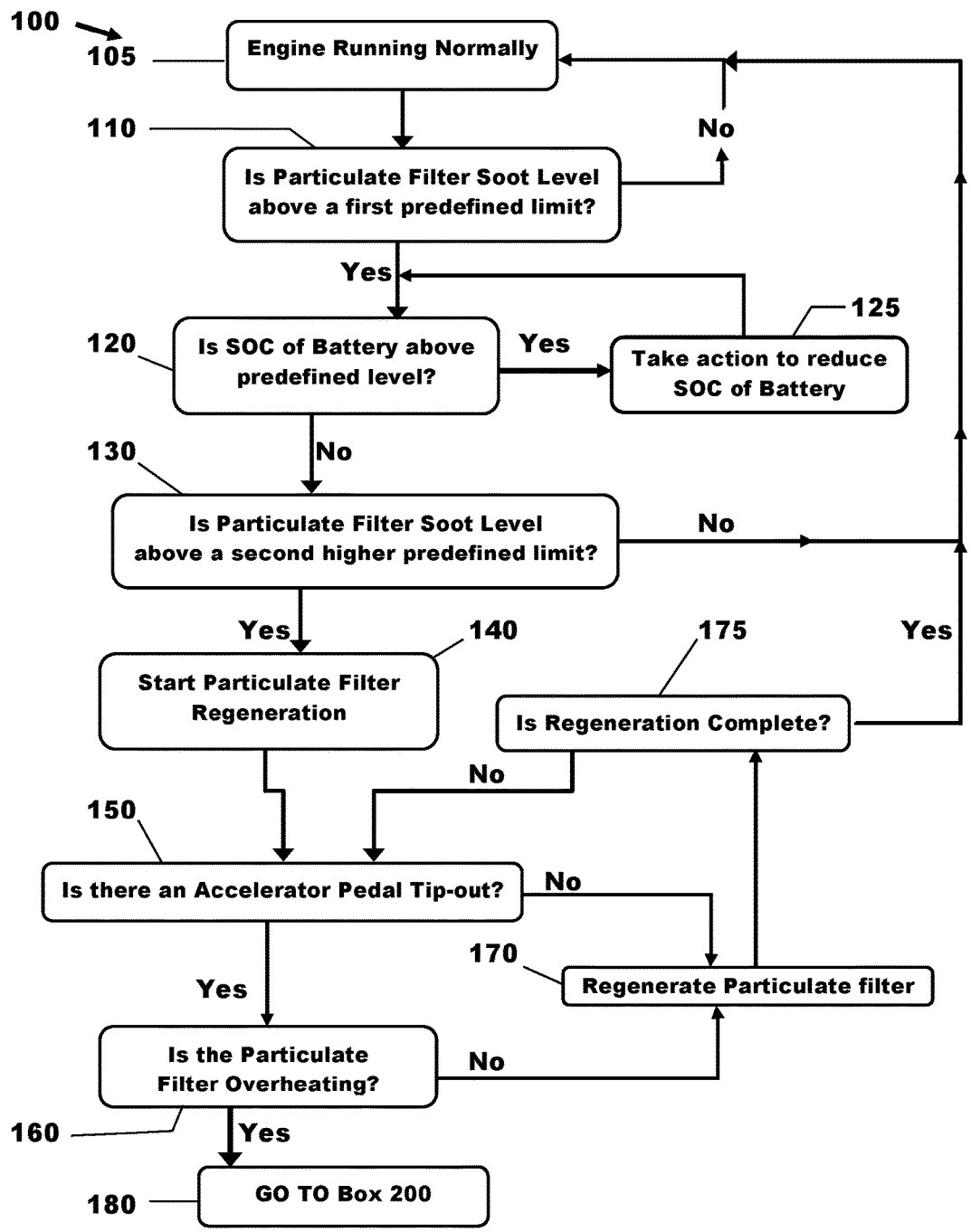
FIG. 2A is a first part of a high level flow chart of a method in accordance with a first aspect of the invention.
Figure 2B:
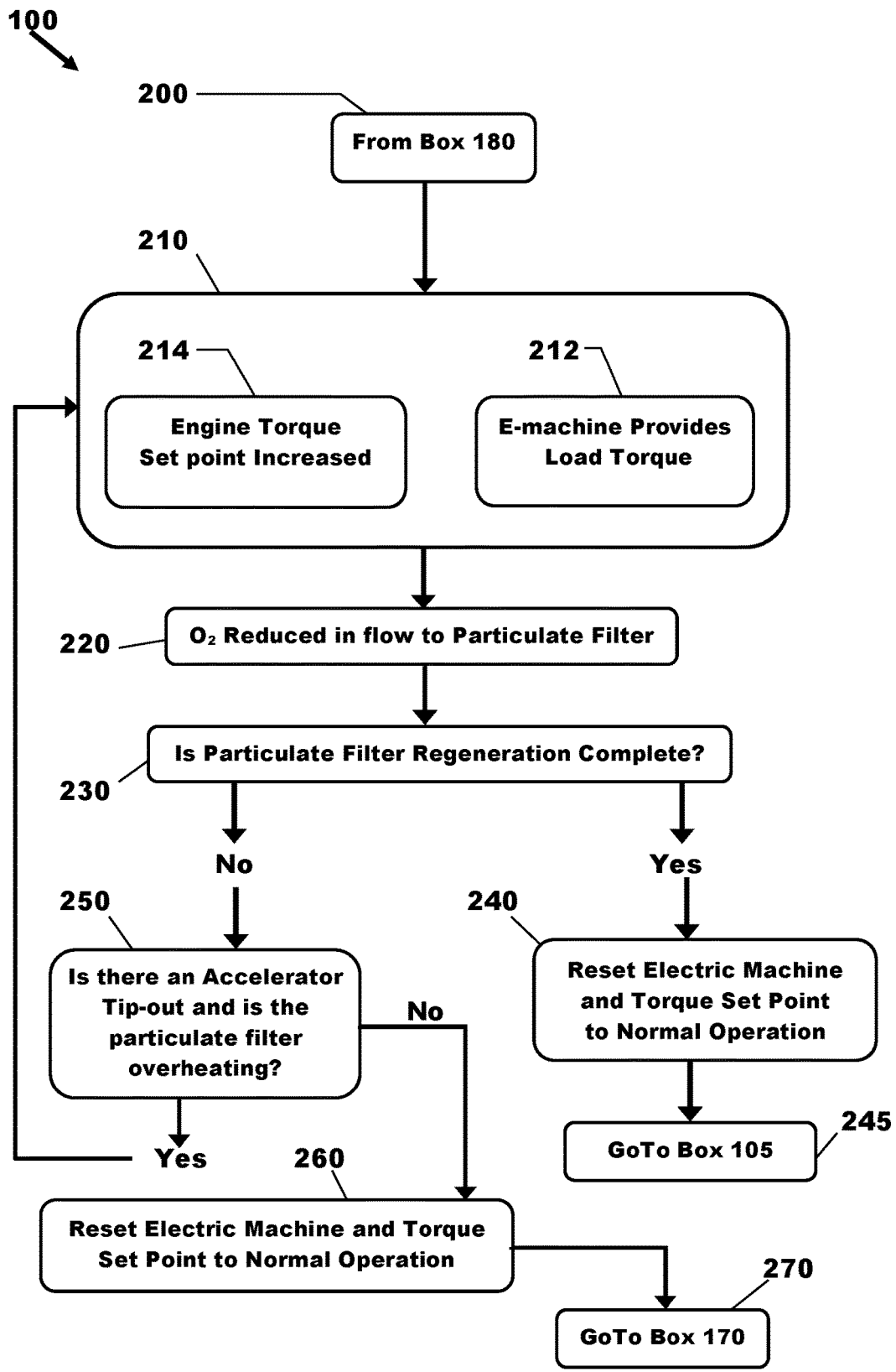
FIG. 2B is a second part of the high level flow chart of the method in accordance with the first aspect of the invention.

With particular reference to FIGS. 2A and 2B, there is shown a method 100 for protecting a particulate filter from overheating during a regeneration event when an engine is decelerating due to an accelerator pedal tip-out.

When an accelerator pedal tip-out is active, a driver of the motor vehicle 5 has removed their foot from the accelerator pedal 7 or is depressing the accelerator pedal 7 such a small amount that the effective torque demand from the accelerator pedal 7 to the engine 10 is zero.

The method starts in box 105 with the engine 10 running normally. That is to say, an electronic controller such as the electronic controller 20 is operating the engine 10 to produce torque in response to a torque demand of the driver as input from the accelerator pedal 7 or in response to a torque demand from a cruise control controller.

From box 105 the method advances to box 110 where it is checked whether a soot loading (SL) of a particulate filter such as the diesel particulate filter (DPF) 15 is above a first predefined limit.

Figure 5:
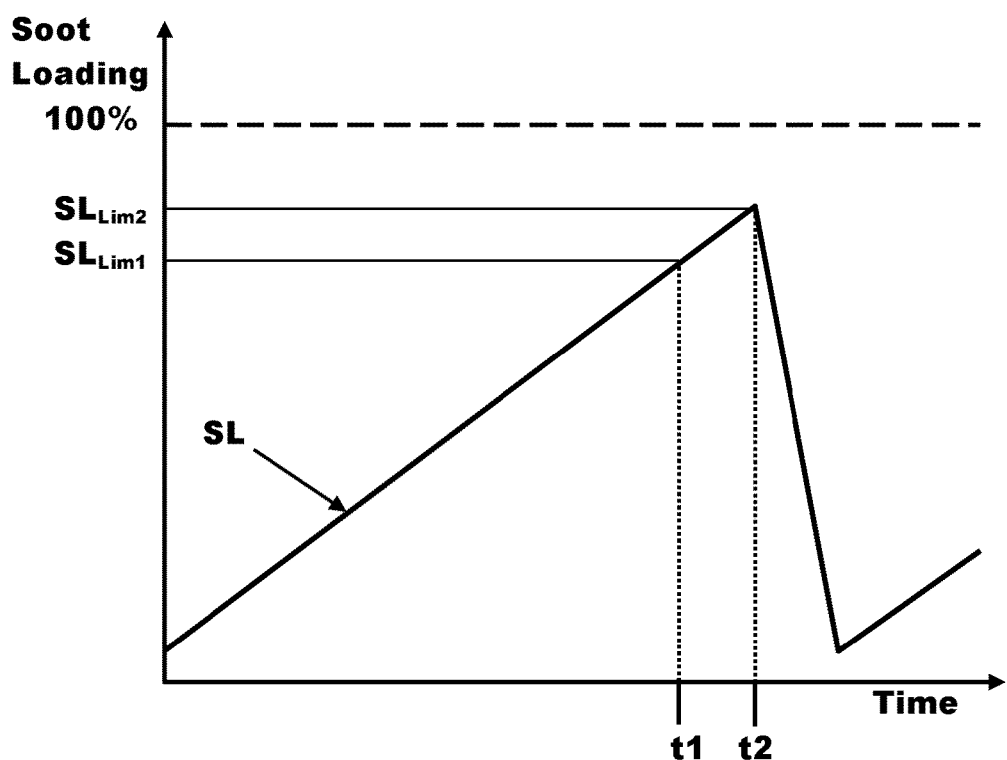
FIG. 5 is a diagrammatic chart showing the relationship between soot loading and time for a DPF during a period of time in which a regeneration event occurs.

With reference to FIG. 5 there is shown a diagrammatic chart showing the filling and regeneration of a particulate filter such as the DPF 15. It will be appreciated that in practice the DPF 15 will not be filled in a linear manner and that the regeneration will not result in a linear removal of soot from the DPF 15. The amount of soot in the DPF 15 referred to as the 'soot loading' is indicated by the line SL. It can be seen that the soot loading SL increases until at time t2 a regeneration event occurs that removes most of the soot from the DPF 15.

Two predefined limits or triggers levels ($SL_{Lim1}$ and $SL_{Lim2}$) are present in the case of this example. The first predefined soot limit $SL_{Lim1}$ is set to a soot loading of circa 75% of full (SL=100%).

This first predefined soot limit $S_{Lim1}$ is used to provide an indication that regeneration of the DPF 15 will likely be required in the near future and is crossed at a time t1 in the example shown.

The second predefined soot limit $S_{Lum2}$ is set to a soot loading of circa 85% of full. This second predefined soot limit $S_{Lum2}$ is used to provide an indication that regeneration of the DPF 15 is required and is sometimes referred to as a "regeneration trigger limit". Provided the conditions for regeneration are present, the second predefined soot limit $S_{Lum2}$ acts as a trigger to start regeneration of the DPF 15 when the soot loading exceeds this limit, which occurs in the case of this example at time t2.

It will be appreciated that the values of 75% and 85% are representative in nature and that the claimed subject matter is not limited to the use of such limits.

Referring back to FIG. 2A, if the estimated soot level in the DPF 15 is below the first predefined soot limit $S_{Lim1}$ the method returns from box 110 to box 105 because regeneration of the DPF 15 is not currently required or expected to be required in the near future.

However, if when checked in box 110, the estimated soot level in the DPF 15 is above the first predefined soot limit $S_{Lim1}$ the method advances from box 110 to box 120 because regeneration of the DPF 15 is likely to be required in the near future.

In box 120 it is checked whether the state of charge (SOC) of the battery 17 is above a predefined SOC limit $SOC_{Lim}$ set to provide a predefined amount of headroom for charging of the battery 17. It will be appreciated that if the battery 17 is fully charged or nearly fully charged it cannot be used as an effective electrical load for the electric machine 16 and so it is desirable to reduce the SOC of the battery 17 if regeneration of the DPF 15 is likely to be required in the near future. However it will also be appreciated that maintaining a high level of charge in the battery 17 is generally advantageous and so it is desirable to discharge the battery 17 only when the DPF 15 is likely to require regeneration in the near future.

If the SOC of the battery 17 is above the SOC limit ($SOC_{Lim}$) then the method advances to box 125, otherwise it advances to box 130. That is to say:—If $SOC > SOC_{Lim}$ GoTo 125 else GoTo 130.

In box 125 the SOC of the battery 17 is actively reduced in an economical and efficient manner. The SOC of the battery 17 can be actively reduced by using the integrated starter generator 16 as a motor to provide supplementary torque thereby either increasing the total torque output available to accelerate the vehicle 5, allow the torque output of the engine 10 to be reduced during cruising to reduce the fuel consumption of the engine 10 or inhibit charging of the battery 17 thereby allowing it to be slowly discharged until the SOC falls below the predefined SOC limit ($SOC_{Lim}$).

If the SOC of the battery 17 is below the SOC limit ($SOC_{Lim}$) then the method advances from box 120 to box 130 where it is checked whether the estimated soot level within the DPF 15 is above the second predefined soot limit ($SL_{Lim2}$).

If the level of soot in the DPF 15 is below the second predefined soot limit ($SL_{Lim2}$) the test is failed and there is no current requirement to regenerate the DPF 15, the method then returns to box 105. In such a case the method will then cycle through the steps 105 to 130 until the test in box 130 is eventually passed.

When the test in box 130 is passed, indicating that the current estimated level of soot in the DPF 15 is above the second predefined soot limit ($SL_{Lim2}$) regeneration of the DPF 15 is required and the method advances to box 140 where regeneration of the DPF 15 commences.

It will be appreciated that in practice the start of regeneration may be delayed until the required operating conditions for regeneration have been obtained. Techniques for regenerating particulate filters are well known in the art see for example EP1744042; GB2496876 and GB2506660.

From box 140 the method advances to box 150 where it is checked whether there is an accelerator pedal tip out event present. This can be checked by the electronic controller 20 by, for example, using the output from the accelerator pedal position sensor 27 to measure whether the accelerator pedal 7 is currently in a resting position or is being depressed by the driver of the motor vehicle 5 to demand torque from the engine 10.

It will be appreciated that the actions in the boxes 140 and 150 could be reversed so that the tip-out is checked before regeneration starts or could be carried out at the same time.

If there is no accelerator pedal tip-out event in progress then the method advances from box 150 to box 170 where regeneration of the DPF 15 continues with no temperature control intervention and then advances from box 170 to box 175 to check whether regeneration is complete.

If regeneration is complete the method returns from box 175 to box 105 with the DPF 15 regenerated otherwise it returns to box 150 and will cycle around boxes 150, 170 and 175 until either there is an accelerator pedal tip-out event present or the DPF 15 is regenerated.

Returning to box 150, if when checked in box 150 there is an accelerator pedal tip-out event present, the method advances from box 150 to box 160.

In box 160 it is checked whether the particulate filter in the form of the DPF 15 is overheating. As previously described this can be achieved by using the temperature sensor 28 to measure the temperature of the exhaust gas exiting the DPF 15 or a temperature sensor (not shown) located within the DPF 15 could be used. However, as an alternative to this approach the temperature within the DPF 15 could be modelled by, for example, using a model of the soot combustion process to estimate the temperate within the DPF 15.

The use of such a soot combustion model has the advantage that there will be no delay between the time the temperature in the DPF 15 is predicted to be excessive and the start of temperature controlling by the electronic controller 20 whereas there is a small delay when the increase is sensed by the downstream temperature sensor 28 because the temperature of the exhaust gas has to increase before its increase can be sensed and so the system then acts reactively.

Furthermore, if a soot combustion model is used such as that disclosed in US Patent Application Publication 2012/0031080, the disclosure of which is hereby incorporated by reference in its entirety, then the increase in temperature can be predicted and so the system can act proactively resulting in the steps required to control the temperature being taken sooner.

For example, if the prediction indicates that the temperature within the DPF 15 during the regeneration is likely to be unacceptably high that is to say, above a predefined limit set based upon a need to prevent damage occurring to the DPF 15, then the DPF 15 is likely to overheat and active temperature control can be initiated as soon a regeneration commences in an accelerator pedal tip-out situation.

Irrespective of the method used to determine whether overheating is likely to occur or is occurring the estimate or sensed temperature is normally compared with a predefined temperature limit such as, for example, 850° C.

If the result of the check in box 160 is that the DPF 15 is not currently overheating or predicted not to overheat, that is to say the measured or predicted temperature is below 850° C. the method advances to box 170 and will then proceed as previously described unless a vehicle key-off event occurs whereupon it ends.

However, if when checked in box 160 the result is that the DPF 15 is overheating or, if a soot combustion model is used, that overheating of the DPF 15 is likely then the method advances from box 160 via boxes 180 and 200 to box 210 shown in FIG. 2B.

Box 210 represents the active temperature control steps taken to preventing overheating of the DPF 15 during a regeneration event during an accelerator pedal tip-out event.

The first step, indicated in box 212, is to switch the electric machine which in this case is the integrated starter-generator 16 driven by the engine 10 into a battery charging mode. This action will cause an increase in the load in the form of torque to be applied to the engine 10.

This increased load would normally cause the speed of the engine to reduce more rapidly because in a conventional accelerator pedal tip-out event no torque is being requested by the driver and the engine 10 is decelerating. However, in the case of this invention, the electronic controller 20 is arranged to balance the load applied by the integrated starter-generator 16 to the engine 10 with an increase in engine output torque demand. The result of the application of the applied torque from the integrated starter-generator 16 in box 212 is therefore counteracted by the electronic controller 20 increasing an engine torque set point as indicated in box 214. The effect of increasing the engine torque set point is to produce a torque output from the engine 10 by injecting fuel in the engine 10 thereby reducing the amount of Oxygen in the exhaust gas flow to the DPF 15 as indicated in box 220. In addition, by matching the increase in torque output from the engine 10 to the load applied by the integrated starter-generator 16, the rate of deceleration of the engine 10 is the same as would be the case if it were to decelerate naturally during a conventional accelerator pedal tip-out event. This has the advantage that a driver of the motor vehicle 5 receives the same feedback from the motor vehicle 5 whether the accelerator pedal tip-out is a conventional one or one in which the temperature of the DPF 15 is being managed by the use of the integrated starter-generator 16 to prevent overheating of the DPF 15.

From box 220 the method advances to box 230 to check whether DPF regeneration is complete. If DPF regeneration is complete, that is to say, it is estimated that the majority of the soot has been removed from the DPF 15 then the method advances to box 240 where the integrated starter-generator 16 is returned to normal operation and the engine torque set point is restored to normal operation and the method then returns to box 105 via box 245 and all subsequent steps are repeated unless a key-off event occurs, whereupon it ends.

However, if when checked in box 230, DPF regeneration is not complete the method advances to box 250 and it is checked whether the DPF 15 is overheating and whether an accelerator pedal tip-out event is still present and if both of these conditions are met the method returns to box 210 and the steps referred to previously are repeated with the reduction of Oxygen supply to the engine 10 being continued.

However, when checked in box 250, if either the DPF 15 is not overheating or there is no longer an accelerator pedal tip-out event then the method advances to box 260 where the integrated starter-generator 16 is returned to normal operation and the engine torque set point is restored to normal operation. The method then returns from box 260 to box 170 via box 270 and all subsequent steps are repeated unless a key-off event occurs, whereupon it ends.

It will be appreciated that the claimed subject matter is not limited to the exact steps described or the precise order in which those steps are executed in the representative embodiments.

Figure 3:
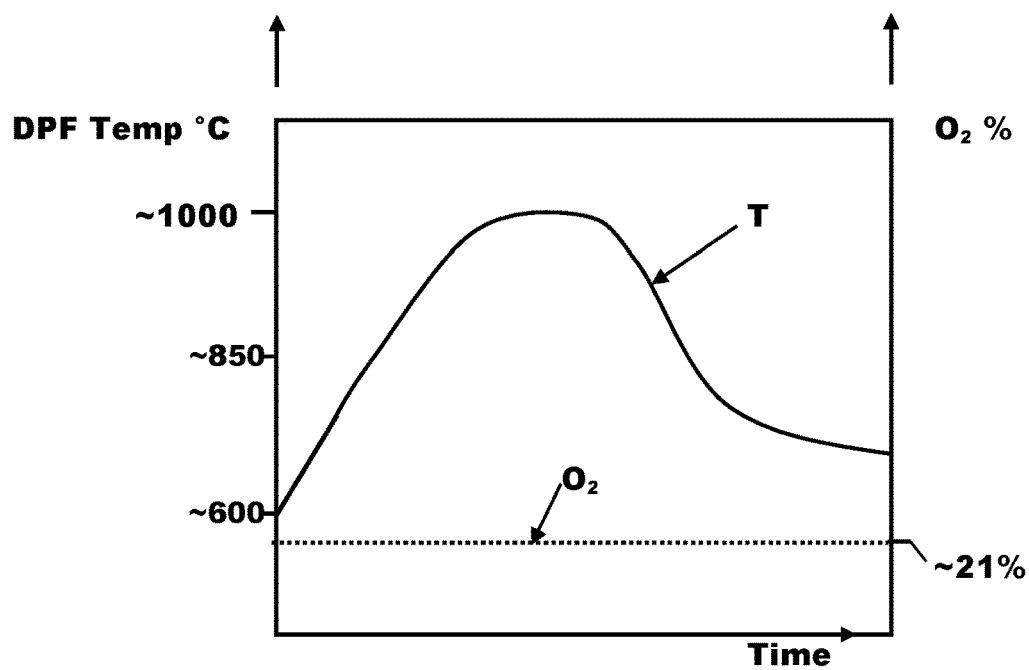
FIG. 3 is a composite chart showing a prior art relationship between temperature and time for a DPF during an accelerator pedal tip-out event while regeneration is occurring and the relationship between Oxygen concentration and time for the same event.
Figure 4:
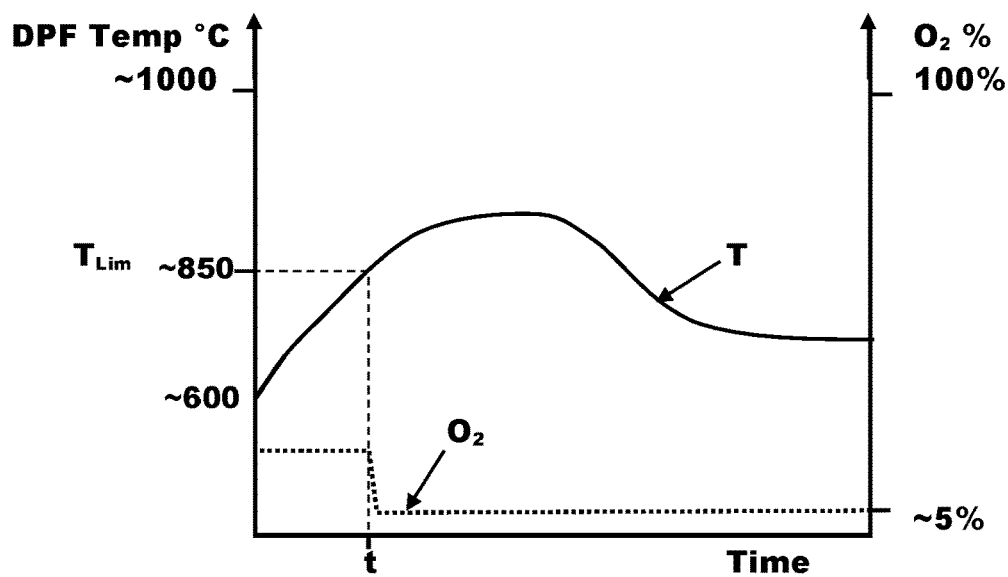
FIG. 4 is a composite chart showing a relationship between temperature and time for a DPF during an accelerator pedal tip-out event while regeneration is occurring in accordance with embodiments of this disclosure and the relationship between Oxygen concentration and time for the same event.

The effect of carrying out a method in accordance with one or more embodiments of this disclosure can be seen by comparing the prior art situation shown in FIG. 3 with the situation when the method 100 is used as shown in FIG. 4.

In the prior art case shown in FIG. 3, an accelerator pedal tip-out event during a DPF regeneration event results in an Oxygen concentration in the exhaust gas of circa 21% as indicated by the line ($O_2$) resulting in a rapid increase in temperature (T) within the DPF due to the availability of Oxygen to fuel combustion of the soot. It will be appreciated that atmospheric air has an oxygen concentration of circa 21%. The temperature in this case continues to rise as no temperature control is active and eventually results in overheating of the DPF during the regeneration event with a peak temperature of circa 1000° C.

In the case of this invention, as shown in FIG. 4, an accelerator pedal tip-out event during a DPF regeneration event initially produces an Oxygen concentration ($O_2$) of circa 21% resulting in a sudden increase in DPF temperature until, at time "t", the conditions for active temperature control are met. That is to say, regeneration is taking place, an accelerator pedal tip-out event is present and the temperature of the DPF 15 has reached or is predicted to exceed the predefined temperature limit $T_{lim}$ which in this case is set at 850° C.

In the case of this example, at time 't', the predefined temperature limit $T_{lim}$ is reached and active temperature control is activated and torque is applied by the integrated starter-generator 16 to the engine 10 and the increase in engine torque set point is made. After making these changes the Oxygen concentration falls to circa 5% resulting in a reduction in the increase in temperature (T) within the DPF 15 due to the limited availability of Oxygen to fuel combustion of the soot in the DPF 15.

Although the claimed subject matter has been described with reference to a mild hybrid vehicle having an integrated starter-generator (ISG) it will be appreciated that it could be applied with benefit to other vehicles having an electric machine able to apply a large enough load on the engine to require an increase in engine output torque of sufficient magnitude to produce the desired reduction in the Oxygen concentration of the exhaust gas flowing to the particulate filter.

Although the invention has been described with reference to a diesel engine having a diesel particulate filter to remove particulate matter from an exhaust flow it will be appreciated that it could be applied to other types of engines having a particulate filter to reduce particulate emissions therefrom.

It will be appreciated by those skilled in the art that although the claimed subject matter has been described by way of example with reference to one or more embodiments it is not limited to the disclosed embodiments and that alternative embodiments could be constructed without departing from the scope of the claimed subject matter as defined by the appended claims.

While representative embodiments are described above, it is not intended that these embodiments describe all possible forms of the claimed subject matter. The words used in the specification are words of description rather than limitation, and it is understood that various changes may be made without departing from the spirit and scope of the disclosure. Additionally, the features of various implementing embodiments may be combined to form further embodiments that may not be explicitly described or illustrated.

What is claimed is:

1. A vehicle comprising:
   an engine;
   a battery;
   an electric machine coupled to the engine and connected to the battery;
   a particulate filter receiving engine exhaust gas; and a controller configured to, in response to predicted particulate filter temperature during a subsequent regeneration exceeding a threshold, operate the electric machine to discharge the battery in preparation for operating the electric machine to charge the battery during the subsequent regeneration while fueling the engine to compensate for torque used by the electric machine to reduce oxygen in the exhaust gas flowing to the particulate filter.

2. The vehicle of claim 1 wherein the controller is further configured to operate the electric machine to discharge the battery in response to soot loading of the particulate filter exceeding a corresponding threshold.

3. The vehicle of claim 1 further comprising a temperature sensor configured to provide an indication of a current particulate filter temperature.

4. The vehicle of claim 3 wherein the temperature sensor is configured to measure temperature of exhaust gas exiting the particulate filter.

5. The vehicle of claim 1 wherein the controller is further configured to estimate the predicted particulate filter temperature during the subsequent regeneration using a soot combustion model.

6. The vehicle of claim 1 further comprising an accelerator pedal, wherein the controller is further configured to operate the electric machine to charge the battery in response to a tip-out of the accelerator pedal during the regeneration.

7. The vehicle of claim 1 wherein the controller is further configured to reduce a state of charge of the battery prior to a regeneration event if the state of charge of the battery is above a predefined level and an estimate of current soot loading of the particulate filter exceeds a regeneration threshold, the regeneration threshold being lower than a threshold that triggers activation of a regeneration event.

8. A vehicle having an engine coupled to an electric machine connected to a traction battery and including a particulate filter configured to receive engine exhaust, comprising:
   a controller configured to:
      operate the electric machine to reduce a state of charge of the traction battery prior to a subsequent filter regeneration event responsive to the state of charge of the battery being above a predefined level and a predicted temperature of the particulate filter during the subsequent regeneration event exceeding a threshold; and
      in response to an accelerator pedal tip-out during the subsequent filter regeneration event and filter temperature exceeding a threshold:
         increase fuel to the engine to reduce oxygen in the engine exhaust; and
         operate the electric machine to charge the battery and offset torque produced by increasing the fuel.

9. The vehicle of claim 8 wherein the controller is further configured to predict the filter temperature during the subsequent regeneration event using a soot combustion model.

10. A vehicle comprising:
    an engine;
    a battery;
    an electric machine coupled to the engine and connected to the battery;
    a particulate filter receiving engine exhaust gas; and
    a controller configured to reduce a state of charge of the battery prior to a regeneration event responsive to the state of charge of the battery being above a predefined level and an estimate of current soot loading of the particulate filter exceeding a regeneration threshold, the regeneration threshold being lower than a threshold that triggers activation of a regeneration event.

11. The vehicle of claim 10 wherein the controller is further configured to, responsive to the activation of the regeneration event, operate the electric machine to charge the battery while fueling the engine to compensate for torque used by the electric machine to reduce oxygen in the exhaust gas flowing to the particulate filter.

12. The vehicle of claim 11 wherein the electric machine comprises an integrated starter-generator.

13. The vehicle of claim 12 wherein the estimate of current soot loading is based on a pressure drop across the particulate filter.

* * * * *